United States Patent [19]

Price et al.

[11] Patent Number: 5,056,088
[45] Date of Patent: Oct. 8, 1991

[54] APPARATUS AND METHOD FOR EFFICIENTLY COUPLING DIGITAL SIGNALS TO A COMMUNICATIONS MEDIUM IN INFORMATION PACKETS

[75] Inventors: John D. Price, Colts Neck; Ralph E. Richardson, Tinton Falls, both of N.J.

[73] Assignee: AT&T Bell Laboratories, Murray Hill, N.J.

[21] Appl. No.: 345,912

[22] Filed: May 1, 1989

[51] Int. Cl.$^5$ .............................................. H04J 3/26
[52] U.S. Cl. ................................................. 370/94.1
[58] Field of Search .......................... 370/94.1, 60, 99

[56] References Cited

U.S. PATENT DOCUMENTS

| | | | |
|---|---|---|---|
| 4,737,950 | 4/1988 | Fechalos | 370/94.1 |
| 4,774,706 | 9/1988 | Adams | 370/94.1 |
| 4,893,306 | 1/1990 | Chao et al. | 370/99 |
| 4,896,316 | 1/1990 | Lespagnol et al. | 370/94.1 |

OTHER PUBLICATIONS

*Technical Aspects of Data Communication,* John E. McNamara Jun., 1977, Chapter 24: "Digital Transmission and Packet Switching Networks" pp. 249-261.
*Computer Networks,* Andrew S. Tannebaum 1981, Chapter 3.4.3 "The Packet Assembler/Disassembler", pp 122-124.
*Computer Networks and Their Protocols,* Davies, Barber, Price; Wiley 1979 "Terminals in the Network" pp. 335-347.

*Primary Examiner*—Douglas W. Olms
*Assistant Examiner*—Min Jung
*Attorney, Agent, or Firm*—Samuel R. Williamson

[57] ABSTRACT

An improved Packet Assembler/Disassembler (PAD) optimizes the assembling of characters into packets for transmission over a packet network. The PAD is arranged to operably connect to and receive character asynchronous data from one or more terminal instruments operating in either a block transfer mode or an echoplexing mode. Characters received by the PAD from a terminal instrument operating in an echoplexing mode are forwarded with no PAD delay. Characters received by the PAD from a terminal instrument operating in a block transfer mode are similarly forwarded with no PAD delay and in full packets with the exception of the last few characters of each block of characters which only partially fill their respective packets. And these partially filled packets are quickly forwarded in a time period which just exceeds the period required for the reception of a single character at the rate of data reception from the terminal instrument.

25 Claims, 4 Drawing Sheets

*TABLE*

| ASYNC INTERFACE SPEED (BITS PER SEC.) | MILLISECONDS PER CHARACTER | MIN_TIMER (MILLISECONDS) |
|---|---|---|
| 300 | 33.33 | 40 |
| 1200 | 8.33 | 10 |
| 2400 | 4.16 | 5 |
| 4800 | 2.08 | 2.5 |
| 9600 | 1.04 | 1.3 |
| 19200 | 0.52 | 0.7 |

APPARATUS AND METHOD FOR EFFICIENTLY COUPLING DIGITAL SIGNALS TO A COMMUNICATIONS MEDIUM IN INFORMATION PACKETS

BACKGROUND OF THE INVENTION

1. Technical Field

The invention relates generally to data transmission and more particularly to a process for optimizing the assembling of asynchronous characters into data packets for transmission through a packet network.

2. Description of the Prior Art

In accordance with recently developing needs to quickly access or provide information, there has been a proliferation of various terminal instruments installed in the business community that receive and transmit data through a character asynchronous format. These instruments include among others: terminals, printers, personal computers operating as terminal emulators, and host computers. A communications link for transferring the data between these terminal instruments is generally provided by telephone transmission systems. These systems are increasing becoming digital in operation employing packet switching networks which use a bit synchronous format for transmission of the data. Operation of a packet switching network is such that messages longer than 1000 bits, for example, are typically broken up into separate messages or "packets" before being transmitted. These packets also contain some additional bits added for address and administrative purposes. And various adapter arrangements are used for performing the packet assembly operation and interfacing the asynchronous terminal instruments to the packet switching network.

Transmission costs in a packet switching network are primarily a function of the number of packets transmitted through the network during each period of communication between terminal instruments. It is important in most operations, therefore, to minimize the number of packets transmitted by the network by collecting as many characters as possible into each packet. But data throughput and responsiveness are affected by the delay encountered by each character in transferring through the network and existing packetizing arrangements cause a major component of that delay.

Terminal instruments transmit asynchronous data in two basic modes, echoplexing and block transfer. Echoplexing occurs when a user types in a character which is transmitted to and then is echoed back by the far-end terminal instrument. By way of example, the characters may be commands to a screen editor provided to manipulate an image on a screen. Block transfers are contained in a spurt of data that occurs during a file transfer between terminal instruments or in response to a users command to a far-end terminal instrument to display a large amount of data.

There are conflicting packet assembly requirements for echoplexing and block transfers. For echoplexing, the packet assembly operation should be as rapid as possible to minimize delays for the user. Assembling the characters into the largest possible packets is of secondary interest because of the relatively slow rate that the characters are usually transmitted from the terminal instrument, e.g., a user typing. During echoplexing operation, the need for the user to get rapid feedback of character echo from the far-end terminal instrument far outweighs the need to assemble large packets.

For block transfers, the packet assembly operation is such that the characters are assembled into the largest possible packets to minimize the number of packets and therefore costs. The packet assembly operation should also be as fast as possible, however, since the time it takes to send the last partially filled packet in a data spurt is critical for operation with many file transfer protocols. In these protocols, a subsequent block transfer will not occur until the previous block transfer has been received and acknowledged by the far end terminal instrument.

For interfacing asynchronous terminal instruments or the like to a packet switching network, an adapter arrangement such as a Packet Assembler/Disassembler (PAD) is typically used to insure that all packets transmitted to the network will be in a specific format. The PAD serves as a concentrator that collects individual characters from one or more terminal instruments and periodically outputs a properly formatted packet containing the most recent character harvest. The International Telegraph and Telephone Consultative Committee (CCITT) Recommendations X.3, X.28 and X.29 define the CCITT PAD interfaces. X.3 defines the PAD parameters, X.28 defines the terminal-PAD interface and X.29 defines the PAD-computer (data terminal equipment) interface.

In accordance with the above indicated conflicting packet assembly requirements, the PAD must optimize the number of characters it accumulates before forwarding a packet, such as occurs when the associated terminal instrument is operating in a block transfer mode. And it must also minimize the delay caused by waiting for more characters, such as occurs when the associated terminal instrument is operating in an echoplexing mode. In an effort to optimize the assembling of characters for each mode before forwarding a packet, an idle timer defined in CCITT, Recommendation X.3 is currently employed in PADs. In operation, this timer provides a data forwarding time-out signal or is reset with each new character received. Thus after the reception of a character by the PAD, if no new characters are received before the idle timer expires, a partially filled packet is forwarded. If new characters are received by the PAD at a spacing less than the idle timer value, however, the idle timer is reset with each character received and forwarding occurs only upon the meeting of some other data forwarding condition such as when the packet is full or upon receipt of a data forwarding character.

In accordance with CCITT Recommendation X.3, the range in time for this idle timer may be set between 50 milliseconds and 12.75 seconds in 50 milliseconds intervals. This idle timer does not minimize the delay caused by the PAD waiting for more characters, particularly at the faster asynchronous data speeds. Due to its inability to distinguish between the reception of an isolated character and the beginning of a data spurt, it waits a minimum of 50 milliseconds before sending an isolated character. The idle timer is also unable to determine when the end of the data spurt, or the end of a block transfer in the data spurt, occurs and again waits a minimum of 50 milliseconds before forwarding an unfilled packet of characters.

It is therefore desirable to have the asynchronous data received from associated terminal instruments quickly and efficiently assembled by an adapter arrangement, irrespective of whether a terminal instrument is operating in a block transfer mode or an echoplexing mode, without the noted disadvantages of existing adapter arrangements.

SUMMARY OF THE INVENTION

In accordance with the invention, there is provided an improved Packet Assembler/Disassembler (PAD) for assembling characters or groups of identifiable digits into packets for transmission over a communications medium such as a packet network. The PAD optimizes the assembling of the characters when receiving character asynchronous data from a terminal instrument operating in either a block transfer mode or an echoplexing mode. The improvement to the PAD is obtained through employing a process or program that advantageously addresses the requirements of data throughput and responsiveness by automatically optimizing for each mode the amount of data in each packet transmitted from the PAD to the network. In accordance with the invention, a "minimum" timer is used by the process in achieving the smallest possible delay time before data is forwarded to the network. This minimum timer is variable and adjusted according to a rate of data received from the terminal instrument. In operation, the timer is adjusted to have a expiration period just greater than the transmission time of a single character at the rate of data received from the terminal instrument. If new characters are received by the PAD within a time period less than that provided by the minimum timer, the timer is reset to its initial value with the reception of each new character.

In the operation of the process, a buffer memory associated with the PAD is periodically scanned in order to detect receipt of characters therein from an associated terminal instrument. In response to this interrogation, the process then makes a decision as to how to process these characters based upon certain illustratively defined parameters such as: the presence or absence of characters in the buffer memory at the time of the scan; a relative measure of the time interval for receipt of each character in the buffer memory; a time period over which the characters are received by the buffer memory; and the number of characters received by the buffer memory in the time period.

In accordance with the illustratively defined parameters, the processing of characters received into the buffer memory may be illustrated by a number of conditions. If in a first illustrative condition, a single character arrives in the buffer memory after a time interval greater than that provided by the timer, the process assumes that an isolated character has arrived and this single character is sent immediately in a packet. If in a second illustrative condition, multiple characters arrive in the buffer memory after a time interval greater than that provided by the timer, the process assumes that the data received is the start of a data spurt and these characters will not be packetized immediately. Rather, these characters and the ones that immediately follow are assembled into full packets before being sent to the packet network. If in the second illustrative condition, other characters do not follow immediately in sequence, the timer will expire with any gap or break in the receipt of data just greater than the transmission time of a single character from the terminal instrument. Upon the expiration of the timer, these characters are sent immediately as a packet. If in a third illustrative condition, multiple characters arriving in the buffer memory are being assembled into full packets and the timer expires, the process assumes that the gap or break in the reception of data represents the end of a block of data in a data spurt or, alternatively, the end of the data spurt. Once the timer expires in this or any of the other illustrative conditions, any data in the buffer memory is sent immediately as a packet.

Thus operation of the process upon receipt of data from a terminal instrument operating in an echoplexing mode is such that characters are forwarded in unfilled packets but with essentially no PAD delay. Operation of the process upon receipt of data from a terminal instrument operating in a block transfer mode is such that characters are forwarded in full packets with the exception of a last partially filled packet which reflects either the end of a data spurt or a block transfer in the data spurt. And this partially filled packet is forwarded in a time period which just exceeds the period required for the reception of one character from the terminal instrument. The process is applicable in any system that receives asynchronous data for packetizing and for transmitting over a packet network. It is easily employed in a packet assembly arrangement disposed between an asynchronous terminal and a packet network.

BRIEF DESCRIPTION OF THE DRAWINGS

The invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
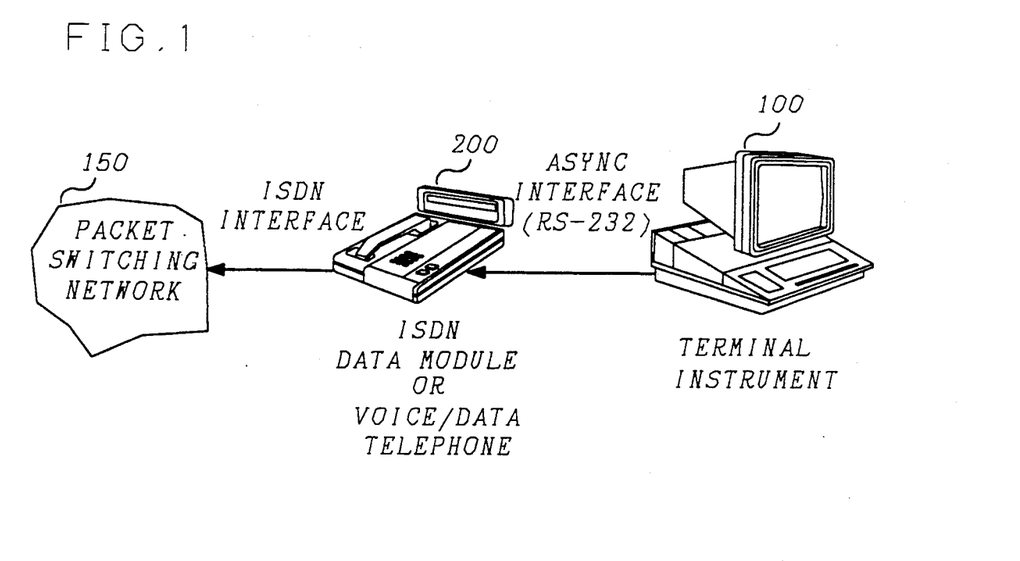
FIG. 1 is a functional system block representation of an asynchronous terminal instrument and data module arranged to interface with a packet switching network operative in accordance with the principles of the present invention.

Referring now to FIG. 1 of the drawing, in accordance with the present invention there is shown a functional block representation of an asynchronous terminal instrument 100 and a data module 200 arranged to interface data between the terminal 100 and a transmission system illustratively shown as a packet switching network 150. The data module 200 may also be a voice/data telephone and may be arranged to simultaneously accommodate more than one terminal instrument.

Data between the terminal instrument 100 and the data module 200 is provided in a character asynchronous format typically via an EIA RS-232-C interface. And data to and from the packet switching network is provided in a bit synchronous format typically in packets of data. The data module 200 serves as an interface adapter for these two data formats. The packet assembly/disassembly operation is conveniently performed by a PAD contained in the data module 200 which is illustratively shown as providing data to an interface for an Integrated Service Digital Network (ISDN) system. It is to be understood, however, that the data module may be arranged to interface with other transmission systems such as those defined by the CCITT X.25 network access protocol. A number of such transmission systems network architectures are described by Andres S. Tanenbaum in *Computer Networks*, Prentice-Hall, Inc., Englewood Cliffs, N.J., 1981, and by Michael J. Miller and Syed V. Ahamed in *Digital Transmission Systems and Networks*, Computer Science Press, Inc., 1988. In this latter reference, a review of the ISDN concept and its potential services are also described.

Figure 2:
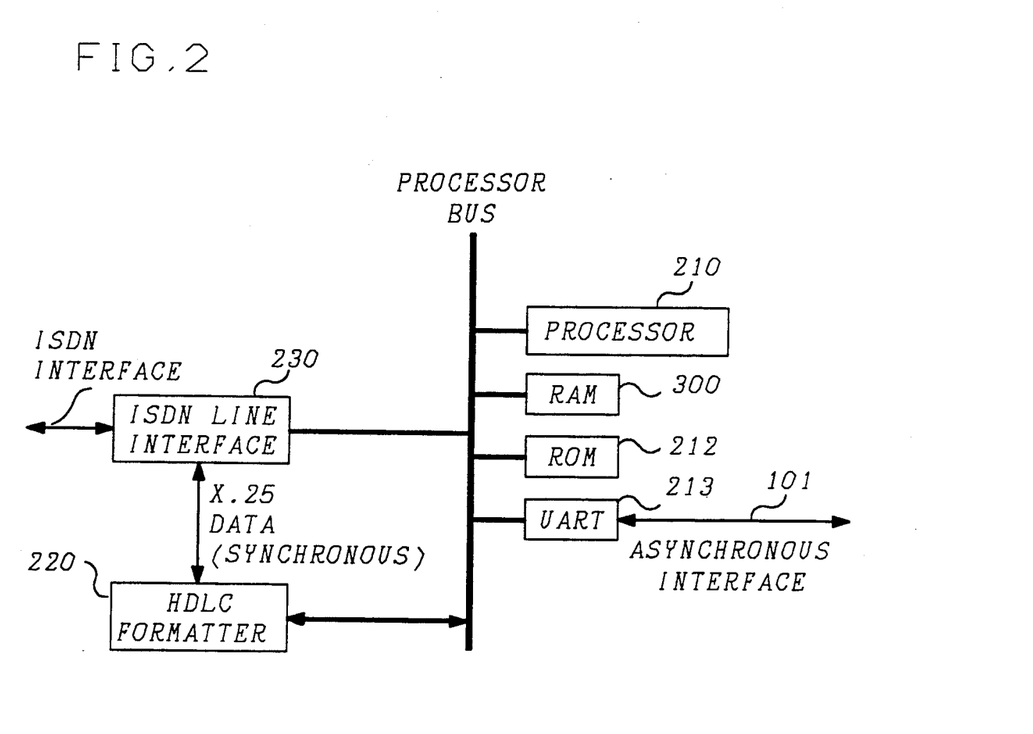
FIG. 2 is a hardware block diagram of the data module in accordance with the invention.

Referring next to FIG. 2, there is shown a functional hardware block diagram of circuitry suitable for providing the packet assembly/disassembly operation performed by the data module 200. This circuitry comprises a processor 210 and associated random access memory (RAM) 300 and read only memory (ROM) 212. Processor 210 may be one of many processors such as the 8088 microprocessor available from Intel Corporation. Also included as part of this circuitry is an universal asynchronous receiver transmitter (UART) 213 which provides an asynchronous interface for data coupled between the data module 200 and the terminal instrument 100 over line 101. An asynchronous interface suitable for use as UART 213 is described in U.S. Pat. No. 4,761,800 issued to G. Lese et al. on Aug. 2, 1988, this patent and this pending application being commonly assigned to the same assignee. The circuit of FIG. 2 further includes a high level Data Link Control (HDLC) formatter 220 and an ISDN line interface 230. The HDLC formatter 220 receives the outgoing data from the processor 210 and formats this data into packets according to the protocol defined by CCITT Recommendation X.25. The packets of data are provided to the ISDN line interface 230 which provides the appropriate header and signals for the data to be suitably interfaced into the ISDN system.

Figure 3:
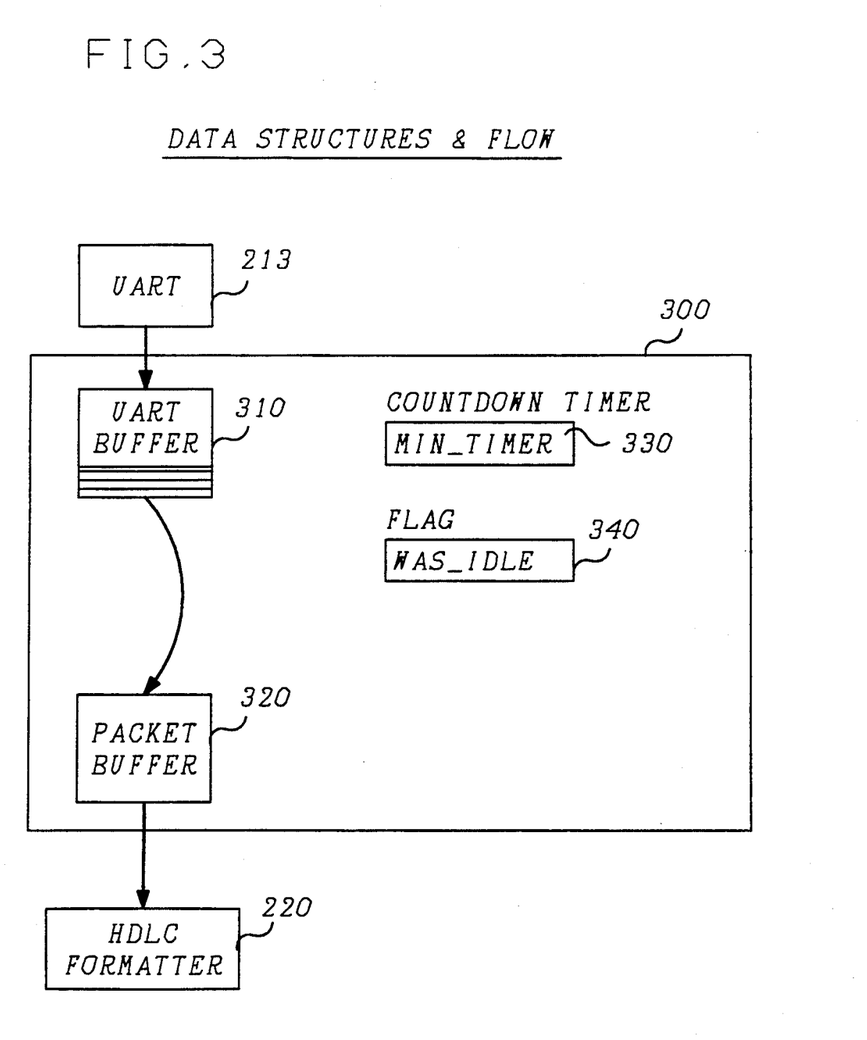
FIG. 3 is an illustration depicting data structures and data flow performed by the data module of FIG. 1 in accordance with the invention.

Referring next to FIG. 3. There is illustratively depicted the data structures and the flow of data in some of the circuitry of FIG. 2. Asynchronous data received by the UART 213 is separated into 8-bit bytes. These bytes are placed into a first-in first-out UART buffer memory 310 in RAM 300. In accordance with the invention a process or program, shown in a flow chart in FIG. 4 and fully described later herein, examines the bytes in this UART buffer memory 310 and decides when to transfer them to a packet buffer memory 320 where they are packetized. Once in the packet buffer memory, the process also decides when to send the packetized data to the HDLC formatter 220 for formatting and transmitting to the ISDN system.

For proper operation of the process, a "minimum" timer 330 is provided by the processor 210 in order to properly determine when to packetize the data in the packet buffer memory 320. The timer 330 is set with a selectable initial starting value and then allowed to count down over time to zero. A range of initial starting values for the timer are illustratively shown in the table of FIG. 5. When the timer 330 reaches zero, it triggers an event in the flow chart, shown in FIG. 4, which is provided to the processor 210. A one-bit "was-idle" flag 340 is set by the timer 330 and also provides information to the processor 210 as part of the flow chart shown in FIG. 4.

Figure 4:
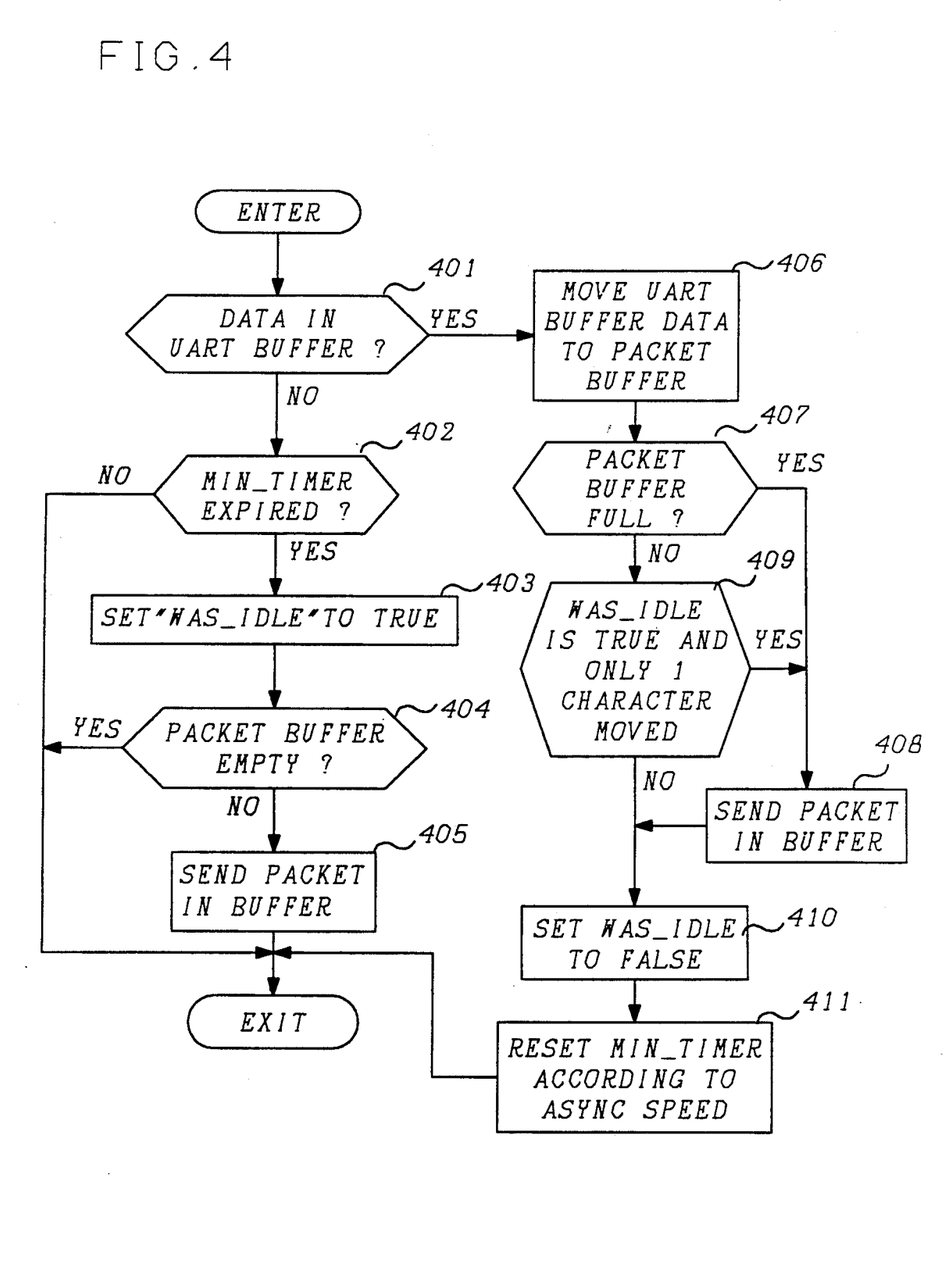
FIG. 4 depicts a flow chart illustrating some of the processing performed by the data module of FIG. 1 in accordance with the invention.
Figure 5:
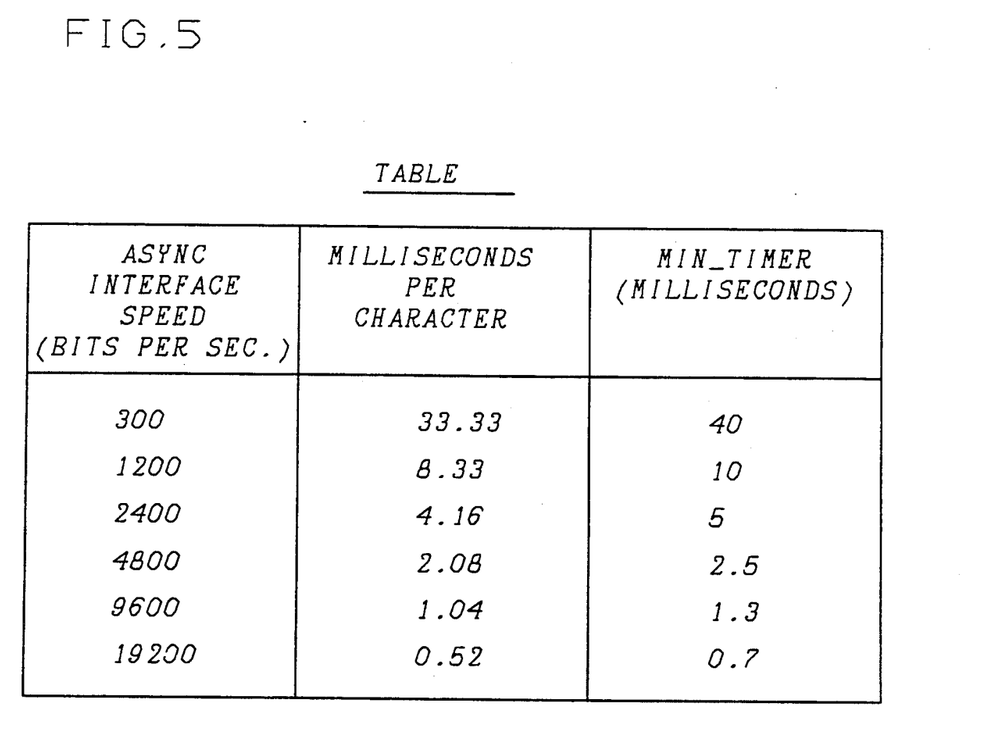
FIG. 5 is a table showing time periods that are assignable to a minimum timer in accordance with a rate of data being provided from the data terminal to the data module.

Referring now to FIG. 4, there is shown the flow chart illustrating the processing performed by the circuitry of FIG. 2. This processing operation will be more easily understood if the circuitry of FIG. 2 and the table in FIG. 5 are both referenced in combination with this flow chart. This processing task is advantageously determined by a process or program stored in ROM 212 and processed by processor 210. The processing task is one of many performed by the processor 210 and is therefore entered approximately once every 1.5 milliseconds. A 1.5 millisecond cycling rate is sufficiently fast for satisfactorily interrogating the fastest character asynchronous data of 19.2 K bits per second expected to be received from a terminal instrument. It is to be understood, however, that the process is functional as is with data rates in excess of 19.2 K bits per second. If desired, a faster cycling rate, and thereby a more precise interrogation, is easily achieved by reducing the number of tasks for the processor so that it may enter this task more frequently, or if the situation dictates, a dedicated processor may be used.

The processing task is entered at decision 401 where it checks for data in the UART buffer memory 310. If there is no data in the UART buffer memory 310, the process advances to decision 402 where it checks to see if the timer 330 has expired. In accordance with existing conditions during the previous cycle, the timer may or may not have been reset at that time. If the timer has not expired and there is no data in the UART buffer memory, the processing task is exited. If the timer has expired at decision 402, the processing task advances to step 403 where the "was idle" flag 340 is set to true for reflecting that data was provided to the UART 213 by the terminal instrument 100 since the last scanning cycle. This is useful in that the next time the processing task is entered, the processor 212 will be able to determine that UART 213 has been idle for the minimum time determined by the timer 330.

The processing task next advances to decision 404 where it determines whether the packet buffer memory 320 is empty. If this buffer memory is empty, the task is exited. If data is in the packet buffer memory at this point, however, this reflects that no additional data has been received in the UART buffer 310 within the minimum time determined by the timer 330. The processing task thus advances to step 405 where the data in the packet buffer memory 320 is processed to add protocol headers and then sent to the HDLC formatter 220. The task is then exited.

Referring once again to decision 401, if any data was found in the UART buffer memory 310, the processing task advances to step 406. In step 406, the data in the UART buffer memory 310 is moved into the packet buffer memory 320. The processing task next advances to decision 407 which monitors the amount of data entering the packet buffer memory 320. If the packet buffer memory is found to be full (typically 128 bytes) by decision 407, the processing task advances to step 408 where the data in the buffer memory is processed as in step 404 and then sent to the HDLC formatter 220.

If the packet buffer memory was found not to be full at decision 407 the processing task advances to decision 409. At this decision, the "was idle" flag 340 is examined and the number of characters moved into the packet buffer memory 320 from the UART buffer memory 310 also determined. If the "was idle" flag 340 is set to true and if only one character was moved into the packet buffer memory, the processing task advances to step 408 where the single character is sent to the HDLC formatter 220.

The goal of a very responsive system to receipt of a single character is thereby achieved. If only one character is received, as just illustrated, the process assumes that it is an isolated character and will immediately send out a packet with just that one character from the terminal instrument. This operation provides the desired high performance in an echoplexing environment where typically only one character is received in a time period that exceeds the time period provided by the timer 330. A single character may be received, by way of example, where a user is typing on a keyboard. Each time the user types a character in the present system, that character is able to quickly go to the far-end terminal instrument and return so that the user is timely provided with the echo of the typed character on his or her screen.

Referring once again to decision 409, this decision provides an indication that data was either received the last time this processing task was entered (the "was idle" flag 340 is set to false) or that there were two or more characters moved into the packet buffer memory since the last time the processing task was entered. The processor interprets this as one of three possible conditions: the start of a data spurt; the middle of the data spurt; or the end of either the data spurt or a block transfer in the data spurt. For each of these conditions, the processing task advances to step 410 where the "was idle" flag is set to false when previously set at true, or kept at false when previously set at false. From this step 410 the processing task advances to step 411 where, if necessary, the timer 330 is reset according to the asynchronous data speed received from the terminal and shown in the table in FIG. 5. Operating under the above conditions, the processor thus waits for more data to accumulate before sending the packet to the HDLC formatter 220.

The processing task, through decision 409, is thus able to quickly determine the beginning of a data spurt or, alternatively, either the end of a data spurt or a block of data. Yet the processing task, through decision 409, also advantageously provides the desired minimum delay allowing time for additional characters to arrive during the middle of a data spurt which does not fill the packet buffer, as determined by decision 407.

The need to efficiently respond to a spurt of data from the terminal instrument is important in achieving a responsive system. During reception of a spurt of data from the terminal instrument, the received data should be packetized into the largest possible packets since a packet switching network essentially charges as a function of how many packets are sent, not of how many characters are in each packet. The desired efficiency is achieved since the PAD packetizes spurts of data into the largest possible packets for sending over the packet switching network. Depending upon such factors as the sampling rate of the processor and the data reception rate from a terminal instrument, however, a first received character in a data spurt may be sent in a single packet. Any cost penalty associated with sending this single character is far outweighed by the automatic operation provided to the PAD. Any requirement to alter options in the PAD to accommodate data received from a terminal instrument while operating in either an echoplexing mode or a block transfer mode is eliminated by employing the process of the present invention.

File transfer efficiency is also improved during block transfers. File transfer from a terminal instrument generally comprises fixed size blocks of data which are transmitted within a data spurt. The number of bytes in a block of data, however, rarely equals the number of bytes in a packet of data. Once a block of data has been sent by the terminal instrument, it then waits for the far-end terminal instrument to acknowledge receipt of that entire block of data before the next block of data is sent. In a long data spurt, filled packets will be transmitted quickly, but partially filled packets containing the last bytes of data in each block will always have some minimal delay while the processor is waiting for additional data from the data spurt to fill these packets.

Use of the process of this invention avoids the delay traditionally associated with the near-end terminal instrument waiting for the far-end terminal instrument to acknowledge receipt of a block of data. Through the above processing task, the processor quickly recognizes a gap in the receipt of data from the terminal instrument and sends the data then accumulated in the packet buffer memory. This allows the far-end terminal instrument to acknowledge sooner the receipt of that block of data. The file transfer is made even more efficient when the far-end terminal instrument also employs the process of this invention in its packet assembly operation.

With further reference to the table shown in FIG. 5, the period of time for the timer 330 is determined in accordance with the speed provided to the asynchronous interface by an associated terminal instrument. A relatively long time period is necessary for receipt of characters at very low speeds. Thus the timer is set for a time period that just exceeds a character receipt time period at each data reception rate and allowed to expire before deciding that the asynchronous interface is idle and that a packet of data should be sent. By way of example, with a data reception rate at 300 baud, the time to receive each character is approximately 33 milliseconds. At this data reception rate, the minimum timer is set to expire at 40 milliseconds awaiting this amount of time before deciding that there has been a gap between characters appearing on the asynchronous interface. At very high speeds, however, the character receipt time period is proportionally very small and the timer is assigned a corresponding shorter time that just exceeds a character receipt time period for the selected data reception rate.

Although only a specific embodiment of the invention has been disclosed herein, it should be apparent to one skilled in the art that numerous modifications and adaptations to the invention may be conceived without departing from the spirit and scope of the invention.

What is claimed is:

1. An apparatus for coupling digital signals to a communications medium in information packets, the apparatus comprising:

signal receiving means for receiving data from an asynchronous signal source, the data being arranged in a plurality of groups of identifiable digits;

processor means for converting the asynchronous signal data from the signal receiving means into information packets;

buffer memory means for storing data from the asynchronous signal source, the data to the buffer memory means being provided by the signal receiving means;

timing means for comparing the time period for receipt of each group of identifiable digits of data into the buffer memory means with a predetermined time period;

sampling means for periodically interrogating the buffer memory means for data stored therein;

counting means for counting the number of groups of identifiable digits of data provided to the buffer memory means between sampling periods provided by the sampling means; and the sampling means being responsive to both the timing means and the counting means for determining the time for receipt and the number of groups of identifiable digits of data stored in the buffer memory means between sampling periods, the data in the buffer memory means being coupled by the processor means to the communications medium in an information packet when both a) the time period for receipt of a group of identifiable digits of data exceeds the predetermined time period and b) only one group of identifiable digits of data is stored in the buffer memory means.

2. The apparatus as in claim 1 wherein the data in the buffer memory means is retained in the buffer memory means until the next sampling period in response to the receipt of multiple groups of identifiable digits of data in the buffer memory means.

3. The apparatus as in claim 1 wherein subsequently received data in the buffer memory means is coupled to the communications medium in an information packet when said one group of identifiable digits of data is stored in the buffer memory means and a variable time period, occurring prior to the receipt of said one group of identifiable digits of data, exceeds the predetermined time period.

4. The apparatus of claim 3 further including means for determining the predetermined time period, the signal receiving means being configurable for measuring a rate of data reception from the asynchronous signal source, the processor means in response to the signal receiving means adjusting the predetermined time period to be proportional to the time period for receipt of said one group of identifiable digits of data.

5. The apparatus of claim 4 wherein the processor means proportionally adjusts the predetermined time period in a manner to just exceed the time required for one group of identifiable digits of data to be received from the asynchronous signal source and provided to the buffer memory means, said data being received at the measured rate of data reception from the asynchronous signal source.

6. The apparatus of claim 5 wherein the predetermined time period is provided by an adjustable count down timer reset to its initial starting value upon the receipt of each group of identifiable digits of data provided to the buffer memory means.

7. The apparatus as in claim 6 wherein the buffer memory means comprises a first and second buffer memory, the first buffer memory receiving the data from the signal receiving means and the second buffer memory receiving the data from the first buffer memory for processing by the processor means.

8. The apparatus as in claim 5 wherein the plurality of groups of identifiable digits are digital representations of characters.

9. The apparatus as in claim 5 wherein the communications medium is a packet switching network.

10. The apparatus as in claim 9 wherein the processor means further includes means for formatting and interfacing the information packets to the packet switching network.

11. An apparatus for coupling digital signals to a communications medium in information packets, the apparatus comprising:

signal receiving means for receiving data from an asynchronous signal source, the data being arranged in a plurality of groups of identifiable digits;

processor means for converting the data from the signal receiving means into information packets;

buffer memory means for storing data from the asynchronous signal source, the data to the buffer memory means being provided by the signal receiving means;

timing means for comparing the time for receipt of each group of identifiable digits of data into the buffer memory means with a predetermined time period;

sampling means for periodically interrogating the buffer memory means for data stored therein;

counting means for counting the number of groups of identifiable digits of data provided to the buffer memory means between sampling periods provided by the sampling means; and the sampling means being responsive to both the timing means and the counting means for periodically determining the time for receipt and the number of groups of identifiable digits of data stored in the buffer memory means between sampling periods, the data in the buffer memory means being coupled by the processor means to the communications medium in an information packet when the time period for receipt of a group of identifiable digits of data exceeds the predetermined time period after the receipt of multiple groups of identifiable digits of data in the buffer memory means.

12. The apparatus of claim 11 further including means for determining the predetermined time period, the signal receiving means being configurable for measuring a rate of data reception from the asynchronous signal source, the processor means in response to the signal receiving means adjusting the predetermined time period to be proportional to the time period for receipt of said one group of identifiable digits of data.

13. The apparatus of claim 12 wherein the processor means proportionally adjusts the predetermined time period in a manner to just exceed the time required for one group of identifiable digits of data to be received from the asynchronous signal source and provided to the buffer memory means, said data being received at the measured rate of data reception from the asynchronous signal source.

14. The apparatus of claim 13 wherein the predetermined time period is provided by an adjustable count down timer reset to its initial starting value upon the receipt of each group of identifiable digits of data provided to the buffer memory means.

15. The apparatus as in claim 14 wherein the plurality of groups of identifiable digits are digital representations of characters.

16. A method of processing data for transmission over a packet network, the method comprising the steps of:

receiving data from an asynchronous signal source, the data being arranged in a plurality of groups of identifiable digits;

storing said data from the asynchronous signal source in a buffer memory;

comparing the time period for receipt of each group of identifiable digits of data into the buffer memory with a predetermined time period;

sampling periodically the buffer memory for interrogating the data stored therein;

counting the number of groups of identifiable digits of data provided to the buffer memory between sampling periods provided by the sampling step;

determining the time period for receipt and the number of groups identifiable digits of data stored in the buffer memory between sample periods;

converting the data into information packets; and transmitting the data in the buffer memory to the packet network in an information packet when both the time for receipt of a group of identifiable digits of data exceeds the predetermined time period and only one group of identifiable digits of data is stored in the buffer memory.

17. The method of processing data for transmission over a packet network as in claim 16 wherein the transmitting step further includes the step of retaining the data in the buffer memory until the next sampling period in response to receipt of multiple groups of identifiable digits of data in the buffer memory.

18. The method of processing data for transmission over a packet network as in claim 16 wherein the transmitting step further includes the step of transmitting subsequently received data in the buffer memory to the packet network in an information packet when said one group of identifiable digits of data is stored in the buffer memory and a variable time period, occurring prior to the receipt of said one group of identifiable digits of data, exceeds the predetermined time period.

19. The method of processing data for transmission over a packet network as in claim 18 further comprising the step of obtaining the predetermined time period, this step including the steps of measuring a rate of data reception from the asynchronous signal source and adjusting the predetermined time period to be proportional to the time period for receipt of said one group of identifiable digits of data.

20. The method of processing data for transmission over a packet network as in claim 19 wherein the step of proportionally adjusting the predetermined time period comprises adjusting said period in a manner to just exceed the time required for one group of identifiable digits of data to be received from the asynchronous signal source and provided to the buffer memory, said data being received at the measured rate of data reception from the asynchronous signal source.

21. A method of processing data for transmission over a packet network, the method comprising the steps of:

receiving data from an asynchronous signal source, the data being arranged in a plurality of groups of identifiable digits;

storing data from the asynchronous signal source in a buffer memory;

comparing the time period for receipt of each group of identifiable digits of data into the buffer memory with a predetermined time period;

sampling periodically the buffer memory for interrogating the data stored therein;

counting the number of groups of identifiable digits of data provided to the buffer memory between sampling periods provided by the sampling step;

determining the time period for receipt and the number of groups of identifiable digits of data stored in the buffer memory between sample periods;

converting the data into information packets; and transmitting the data in the buffer memory to the packet network in an information packet when the time period for receipt of a group of identifiable digits exceeds the predetermined time period after the receipt of multiple groups of identifiable digits of data in the buffer memory.

22. An apparatus for coupling data to a communications medium in information packets, the apparatus comprising:

means for receiving data from an asynchronous signal source, the data being arranged in a plurality of groups of identifiable digits;

means for determining from a range of time periods a first time period for receipt of each group of identifiable digits received from the asynchronous signal source;

means for determining a predetermined time period from the first time period, the predetermined time period being varied as a function of the determined first time period so that it just exceeds the first time period; and means for coupling to the communications medium an information packet containing one group of identifiable digits when the group of identifiable digits received from the asynchronous signal source is preceded by a time period at least equal to the predetermined time period.

23. An apparatus for coupling data to a communications medium in information packets, the apparatus comprising:

means for receiving data from an asynchronous signal source, the data being arranged in a plurality of groups of identifiable digits; and means for determining a time period for receipt of each one of multiple groups of identifiable digits received from the data receiving means, and for coupling to the communications medium an information packet containing the multiple groups of identifiable digits when the time period for receipt of one group of identifiable digits exceeds a predetermined time period after the receipt of the multiple groups of identifiable digits from the asynchronous signal source, said predetermined time period being varied as a function of the received time period detected by said determining means so that it just exceeds said received time period.

24. A method of processing data for transmission over a packet network, the method comprising the steps of:

receiving data from an asynchronous signal source, the data being arranged in a plurality of groups of identifiable digits;

determining from a range of time periods a first time period for receipt of each group of identifiable digits received from the asynchronous signal source;

determining a predetermined time period from the first time period, the predetermined time period being varied as a function of the determined first time period so that it just exceeds the first time period; and coupling to the communications medium an information packet containing one group of identified digits when the group of identifiable digits received from the asynchronous signal source is preceded by a time period at least equal to the predetermined time period.

25. A method of processing data for transmission over a packet network, the method comprising the steps of:

receiving data from an asynchronous signal source, the data being arranged in a plurality of groups of identifiable digits;

determining a time period for receipt of each one of multiple groups of identifiable digits received from the data receiving means, and for coupling to the communications medium an information packet containing the multiple groups of identifiable digits when the time period for receipt of one group of identifiable digits exceeds a predetermined time period after the receipt of the multiple groups of identifiable digits from the asynchronous signal source, said predetermined time period being varied as a function of the received time period detected by said determining means so that it just exceeds said received time period.

* * * * *